2 Sheets—Sheet 1.

I. F. THOMPSON.

Assignor of one-half to W. L. PALMER.

CUT-OFF VALVE GEAR.

No. 11,128. Reissued Nov. 25, 1890.

Witnesses,
J. H. Krause
H. C. Lee.

Inventor,
Isaac F. Thompson

THE NORRIS PETERS CO., PHOTO-LITHO., WASHINGTON, D. C.

2 Sheets—Sheet 2.

I. F. THOMPSON.

Assignor of one-half to W. L. PALMER.

CUT-OFF VALVE GEAR.

No. 11,128. Reissued Nov. 25, 1890.

Witnesses,
J. H. Squire
H. C. Lee.

Inventor,
Isaac F. Thompson

THE ROBBS PETERS CO., PHOTO-LITHO., WASHINGTON, D. C.

UNITED STATES PATENT OFFICE.

ISAAC F. THOMPSON, OF SAN FRANCISCO, CALIFORNIA, ASSIGNOR OF ONE-HALF TO WALES L. PALMER, OF SAME PLACE.

CUT-OFF-VALVE GEAR.

SPECIFICATION forming part of Reissued Letters Patent No. 11,128, dated November 25, 1890.

Original No. 410,775, dated September 10, 1889. Application for reissue filed September 20, 1890. Serial No. 365,682.

*To all whom it may concern:*

Be it known that I, ISAAC F. THOMPSON, a citizen of the United States, residing in the city and county of San Francisco, State of California, have invented an Improvement in Automatic Cut-Off-Valve Gear for Engines; and I hereby declare the following to be a full, clear, and exact description of the same.

My invention relates to improvements in reciprocating-piston engines with sliding or piston valves; and it consists in the constructions and combinations of devices which I shall hereinafter fully describe and claim.

Figure 4:
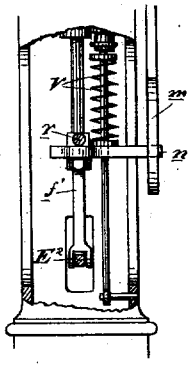
Figure 1:
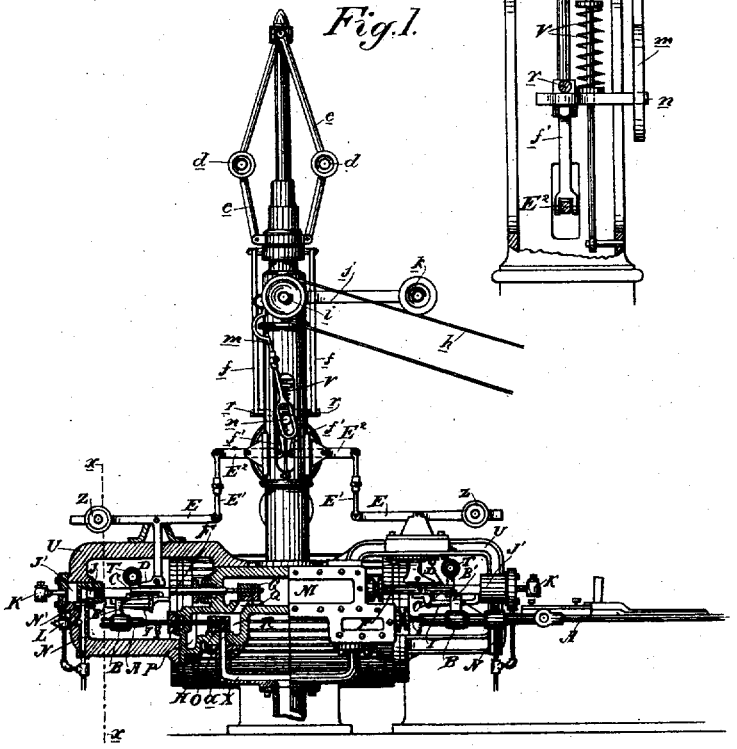
Figure 2:
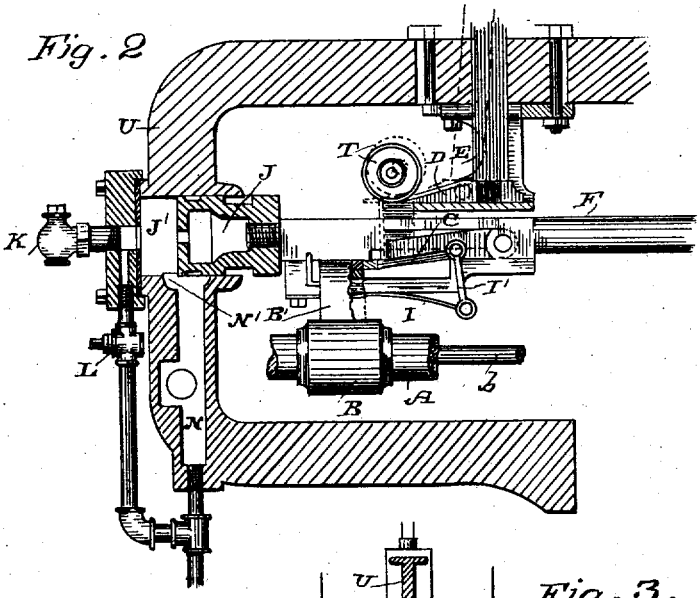
Figure 3:
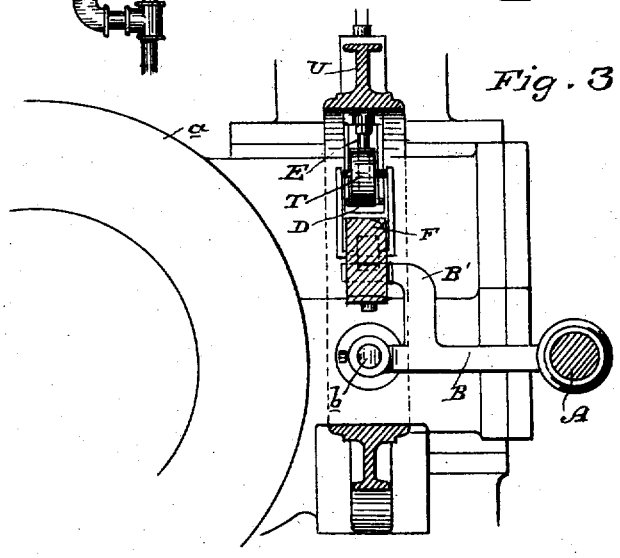

Referring to the accompanying drawings for a more complete explanation of my invention, Figure 1 is an elevation showing the exterior of the right half of the steam-chest and a section of the left half, also showing the governor and the intermediate connections. Fig. 2 is an enlarged view of the tripping mechanism, dash-pot, and other parts. Fig. 3 is a transverse section taken through X X of Fig. 1, looking toward the cylinder-head. Fig. 4 is an enlarged section or part of the governor, showing the position of the spring.

The cylinder *a* is shown in the present case in a horizontal position, and is provided with the usual piston, piston-rod, guides, crank, connecting-rod, crank-shaft, and a single eccentric, which in no way differ from those in common use and are therefore not here shown. The eccentric-rod A is reciprocated by an eccentric upon the main crank-shaft and travels in suitable guides. Upon this rod are fixed the arms B, which are situated beyond each end of the cylinder and serve to actuate both steam and exhaust valves. The arms B have two prongs, and as each end of the cylinder is a counterpart of the other I shall hereinafter describe the construction and operation of the mechanism of one end only, the other being operated in the same manner. One of the prongs of the arm B is fixed to the exhaust-valve stem *b* and reciprocates it, and with it the exhaust-valve H within its chamber R, this movement being of equal length and simultaneous with the movement of the eccentric-rod itself. The other prong of the arm B operates the main steam-cut-off valve through the piston F, which passes through a stuffing-box and enters the steam-chamber Q, and is there connected with the steam-valve G.

M is a steam-port leading from the steam-chamber into the exhaust-chamber R, and thence through the port P into the cylinder. Steam is exhausted from the cylinder through the port P, and thence, when the exhaust-valve H is opened, through the port O and exhaust-pipe X.

C is a trigger or tripping device hinged or pivoted to the valve-piston F.

T is a small wheel, which is attached by a rigid connection directly with the hinged trigger C. The prong B′ of the arm B has a steel block fitted into it to prevent wear, and when this arm comes in contact with the end of the trigger C it presses the valve-piston F in the same direction as long as the contact is maintained. If the trigger C is not lifted so as to break the contact, it will be manifest that the valve G will be opened and remain so throughout the full stroke of the engine-piston; but if the trigger C is lifted so as to cause it to trip, the valve-piston F will be immediately forced back by the pressure of steam upon its inner end, while the arm B B′ will continue its reciprocation with the movement of the eccentric.

I is a stout spring fixed beneath the valve-piston and connected by links I′ with the hinged trigger C, the action of the spring pulling the trigger down and holding it in position, so that its free end will be engaged by the prong B′, as above described, when the arm is moved toward the trigger by the reciprocation of the eccentric-rod. A sufficient weight would accomplish this result if the engine is run slowly; but the spring is more positive and effective.

D is an inclined or wedge-shaped foot supported upon the lower end of the bell-crank lever E, which is fulcrumed or journaled upon the frame or yoke U, and by the movement of this lever E this inclined foot D is moved toward the wheel T or drawn away from it. This lever and inclined foot are moved by connecting rods and levers directly from the governor, as will be hereinafter more fully explained. When the engine runs rapidly; the governor will act upon the bell-crank lever E and will move the inclined or wedge-shaped foot D toward the wheel T, and this wheel or shoe will move up the incline D sooner or later, according to the speed of the governor, and by reason of its connection with the trigger C it will lift this trigger until it is high enough to allow the prong B′ to pass beneath it, when the valve stem or piston will instantly return and move the valve with it, so as to close the steam-inlet port.

The "valve-piston" F, as I have termed it, has a sufficient area within the steam-chest, so that the pressure of steam upon the end of this piston will immediately force it back, carrying the steam-valve G and instantly closing the steam-port M, so as to cut off the supply of steam from the cylinder. It will be manifest that the point at which steam is thus cut off will depend upon the point to which the wedge-shaped foot D has been moved. If it is moved very much toward the wheel T, the latter will move up on the incline at an early point in the stroke and will cut the steam off very soon after the piston has commenced its travel; but if the load is heavy and the engine is working slowly this foot will be withdrawn and the contact between the trigger C and the prong B′ will be maintained as long as the foot is out of engagement with the wheel or shoe T.

J is a piston fixed to the rear end of the valve-stem F and fitting within the air-cushion cylinder J′, which receives it upon the back-stroke of the piston, and thus relieves the shock of the return of the piston and valve. Air is admitted into this air-chamber by means of a valve at K, and the amount of compression in the cushion is regulated by a cock at L.

N is the escape-passage for the air which is admitted into the cushion-chamber, the upper end of this passage being elongated, as shown at N′, so that the piston J will move back to a considerable distance before it reaches the point where it cuts off the escape of air through this elongation N′ and the cushion actually commences. This construction allows the valve to move rapidly and to entirely close before the cushion commences.

The governor in the present case consists of the weights *d*, with the usual jointed arms *e*, connected with a vertically-moving collar, and, through the rods *f f′*, the lever $E^2$, and the connecting-rod E′, with the bell-crank lever E, which actuates the wedge-shaped foot D, as before described. A high speed from the breaking of the governor-belt or other cause would, through the governor and its connections, force the wedge beneath the shoe T and lift the trigger C, so that it would not be engaged by the prong B′, and the valves G would remain closed and the engine would stop with the throttle-valve wide open. A spiral spring V is fitted to engage the cross-bar *r* and act through it and the rods *f* to steady the movement of the governor.

The governor is driven by a belt *h*, passing around the pulley *i*, and upon the shaft of this pulley is a lever-arm *j*, having a pulley *k* journaled upon its outer end, so as to rest upon the belt *h*. The opposite end of the lever *j*, projecting beyond the shaft of the pulley *i*, has connected with it a rod *m*, the lower end of which is slotted, and a pin *n* passes through this slot and is attached to the cross-bar *r*, so that, while the governor is allowed sufficient variation in its ordinary movement to control the engine, if the belt *h* should break it would allow the pulley *k* to fall and through the lever *j* to immediately force the bar *r* up, and through the connecting-rods and levers force the wedge D beneath the shoe T and shut off the engine.

Z is a counterbalance-weight fixed upon an extension of the bell-crank lever E, and by its adjustment the operation of the connected parts may be made as delicate as may be necessary or desirable.

The whole of the cut-off mechanism is exceedingly simple and sensitive and its range is from nothing to the full stroke of the piston. This engine may be operated by air or any other elastic medium. It will be manifest that springs or weights may be employed to close the valve after the tripping device has been released without essentially changing the character of the device.

Having thus described my invention, what I claim as new, and desire to secure by Letters Patent, is—

1. In a reciprocating-piston engine, independent steam and exhaust valves at each end, a single eccentric-rod having an arm connecting it directly with the exhaust-valve stem, and an independent branch of this arm, in combination with the steam-valve rod or stem having a trigger hinged thereto, so that one end will be engaged by the independent arm from the reciprocating eccentric-rod, a wheel or shoe connected with said trigger, and an inclined or wedge-shaped foot connected with the governor and movable to or from the wheel by the action of the governor, whereby the trigger is raised and disengaged from the arm moved by the eccentric, substantially as herein described.

2. In a reciprocating engine, a steam-chamber with a separate slide-valve at each end independent of each other, each valve having a rod connecting with it and extending out through the end of the steam-chamber and forming a piston upon which the steam within the chest acts so as to force it outward when released and close the steam-ports, in combination with the cylinder of said engine, having a separate exhaust-chamber at each end, with slide-valve to each, all of said steam and exhaust valves actuated by one or more eccentric-rods, substantially as herein described.

3. The sliding steam-valve with its steam-actuated piston or rod, the trigger hinged to said rod outside the steam-chest, a spring by which said trigger is drawn down, an arm projecting from the eccentric-rod, so as to engage the depressed end of the trigger, a wedge-shaped foot, and a bell-crank lever whereby the foot is advanced or retracted by the action of the governor, and a wheel or shoe connected with the trigger, so as to move upward on the wedge-shaped foot and raise the trigger and disengage it from the arm, substantially as herein described.

4. The combination, with steam-valve, the reciprocating rod extending outward through the end of the steam-chest, having its inner end formed to be acted upon by steam-pressure, a trigger hinged to said rod, and an arm projecting from the eccentric-rod, so as to engage said trigger, of a bell-crank lever and inclined wedge-shaped foot adapted to ride under a projection on said trigger, whereby the latter is lifted and disengaged from the actuating-arm, and the air-cushion chamber, and the piston reciprocating within said chamber and connected with the steam-valve rod, substantially as herein described.

5. The combination, with the sliding steam and exhaust valves of a reciprocating engine and an eccentric-rod by which they are moved, of a trigger connected with the steam-valve stem and actuated by the rod, a governor, and intermediate connecting mechanism comprising a wedge-shaped foot and projection on the trigger, whereby the trigger is lifted and disengaged from the actuating-rod and the admission of steam to the cylinder is cut off, substantially as herein described.

6. The combination, with the valve-actuating mechanism, of the governor, the inclined foot, the bell-crank lever, the rods and levers, as shown, and the spring V, whereby the vibrations of the governor are modified, substantially as herein described.

7. The bell-crank lever, the inclined tripping-foot, the governor, and rods connecting it with the bell-crank lever, in combination with the cross-bar having the pin *n*, the pulley *k*, the lever *j*, and rod *m*, having its lower end slotted, substantially as herein described.

In witness whereof I have hereunto set my hand.

ISAAC F. THOMPSON.

Witnesses:
S. H. NOURSE,
LINCOLN SONNTAG.